US010583836B2

(12) United States Patent
Takada et al.

(10) Patent No.: US 10,583,836 B2
(45) Date of Patent: Mar. 10, 2020

(54) CONTROL APPARATUS FOR VEHICLE

(71) Applicant: Hitachi Automotive Systems, Ltd., Hitachinaka-shi, Ibaraki (JP)

(72) Inventors: Nahoko Takada, Tokyo (JP); Naoyuki Tashiro, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 51 days.

(21) Appl. No.: 15/580,100

(22) PCT Filed: Jun. 17, 2016

(86) PCT No.: PCT/JP2016/068024
§ 371 (c)(1),
(2) Date: Dec. 6, 2017

(87) PCT Pub. No.: WO2017/006743
PCT Pub. Date: Jan. 12, 2017

(65) Prior Publication Data
US 2018/0178795 A1 Jun. 28, 2018

(30) Foreign Application Priority Data
Jul. 3, 2015 (JP) ................. 2015-134094

(51) Int. Cl.
B60W 10/04 (2006.01)
B60W 30/16 (2020.01)
(Continued)

(52) U.S. Cl.
CPC .......... B60W 30/162 (2013.01); B60W 10/02 (2013.01); B60W 10/04 (2013.01);
(Continued)

(58) Field of Classification Search
CPC ........ Y10T 477/6433; Y10T 477/6418; B60W 30/162; B60W 30/10; B60W 30/18072;
(Continued)

(56) References Cited

U.S. PATENT DOCUMENTS 6,334,834 B1 * 1/2002 Mizutani ............... B60T 13/585
477/203
8,494,737 B2 7/2013 Maier et al.
(Continued)

FOREIGN PATENT DOCUMENTS

CN 104002793 A 8/2014
CN 104334429 A 2/2015
(Continued)

OTHER PUBLICATIONS

International Search Report (PCT/ISA/237) issued in PCT Application No. PCT/JP2016/068024 dated Aug. 23, 2016 with English translation (four (4) pages).
(Continued)

Primary Examiner — Roger L Pang
(74) Attorney, Agent, or Firm — Crowell & Moring LLP

(57) ABSTRACT

Provided is a novel control apparatus for a vehicle which allows the number of stops and restarts to be reduced while performing engine stop and coasting control. The configuration is such that, when there is a high probability of restarting an engine under circumstances where engine stop and coasting control is performed, the engine is maintained in idling operation while only the clutch is disengaged. For example, if it is determined that there is a high probability of restarting due to a change in the acceleration of a host vehicle or a preceding vehicle, the clutch is disengaged and the vehicle is coasted. Since the engine is maintained in an idle state, there is no need for restarting, and the number of restarts can be minimized.

12 Claims, 12 Drawing Sheets

(51) Int. Cl.
  *B60W 10/02* (2006.01)
  *B60W 10/06* (2006.01)
  *F02D 29/02* (2006.01)
  *B60W 30/182* (2020.01)
  *F16D 48/02* (2006.01)
  *F02N 11/08* (2006.01)
  *B60W 30/18* (2012.01)
  *B60W 30/10* (2006.01)

(52) U.S. Cl.
  CPC ............ *B60W 10/06* (2013.01); *B60W 30/10* (2013.01); *B60W 30/16* (2013.01); *B60W 30/182* (2013.01); *B60W 30/18072* (2013.01); *F02D 29/02* (2013.01); *F02N 11/0814* (2013.01); *F02N 11/0837* (2013.01); *F16D 48/02* (2013.01); *B60W 2540/10* (2013.01); *B60W 2540/12* (2013.01); *B60W 2550/30* (2013.01); *F02N 2200/121* (2013.01); *F02N 2200/123* (2013.01); *F02N 2200/124* (2013.01); *F02N 2200/125* (2013.01); *Y02T 10/76* (2013.01); *Y10T 477/6418* (2015.01); *Y10T 477/6433* (2015.01)

(58) Field of Classification Search
  CPC .... B60W 30/182; B60W 10/04; B60W 10/06; B60W 10/02; B60W 30/16; B60W 2540/10; B60W 2550/30; B60W 2540/12; F02N 11/0837; F02N 11/0814; F02N 2200/123; F02N 2200/121; F02N 2200/124; F02N 2200/125
  See application file for complete search history.

(56) References Cited

U.S. PATENT DOCUMENTS

| | | | |
|---|---|---|---|
| 2013/0296119 A1 | 11/2013 | Reed et al. | |
| 2014/0162846 A1 | 6/2014 | Yoon et al. | |
| 2015/0088349 A1 | 3/2015 | Akashi et al. | |
| 2015/0100212 A1 | 4/2015 | Moon et al. | |
| 2015/0151761 A1 | 6/2015 | Suzuki et al. | |
| 2015/0158491 A1* | 6/2015 | Suzuki ............ | B60W 30/18072 701/67 |
| 2015/0166065 A1* | 6/2015 | Kuroki ................. | B60W 10/02 477/185 |
| 2015/0166066 A1* | 6/2015 | Suzuki ............... | F02N 11/0833 477/174 |
| 2015/0175150 A1 | 6/2015 | Zhao et al. | |
| 2015/0291171 A1 | 10/2015 | Kuroki et al. | |
| 2015/0307103 A1* | 10/2015 | Kuroki ................... | F16H 61/21 701/70 |
| 2016/0017825 A1* | 1/2016 | Maeda ................. | F02D 41/022 701/58 |

FOREIGN PATENT DOCUMENTS

| | | |
|---|---|---|
| CN | 104470782 A | 3/2015 |
| CN | 104603448 A | 5/2015 |
| CN | 104724111 A | 6/2015 |
| CN | 104755727 A | 7/2015 |
| DE | 10 2004 017 115 A1 | 10/2005 |
| EP | 2 738 412 A1 | 6/2014 |
| JP | 2007-291919 A | 11/2007 |
| JP | 2012-97843 A | 5/2012 |
| JP | 2014-92102 A | 5/2014 |
| JP | 2015-59639 A | 3/2015 |
| WO | WO 2013/046381 A1 | 4/2013 |
| WO | WO 2014/060823 A1 | 4/2014 |
| WO | WO 2015/046616 A1 | 4/2015 |

OTHER PUBLICATIONS

Japanese-language Written Opinion (PCT/ISA/210) issued in PCT Application No. PCT/JP2016/068024 dated Aug. 23, 2016 (five (5) pages).
Extended European Search Report issued in counterpart European Application No. 16821213.2 dated Feb. 12, 2019 (15 pages).
Chinese-language Office Action issued in counterpart Chinese Application No. 201680024815.0 dated Jul. 16, 2019 with English translation (30 pages).

* cited by examiner

STATE 1 (ONLY PRECEDING VEHICLE ENTERS SLOPE)

STATE 2 (SUBJECT VEHICLE COMPLETES ENTERING SLOPE)

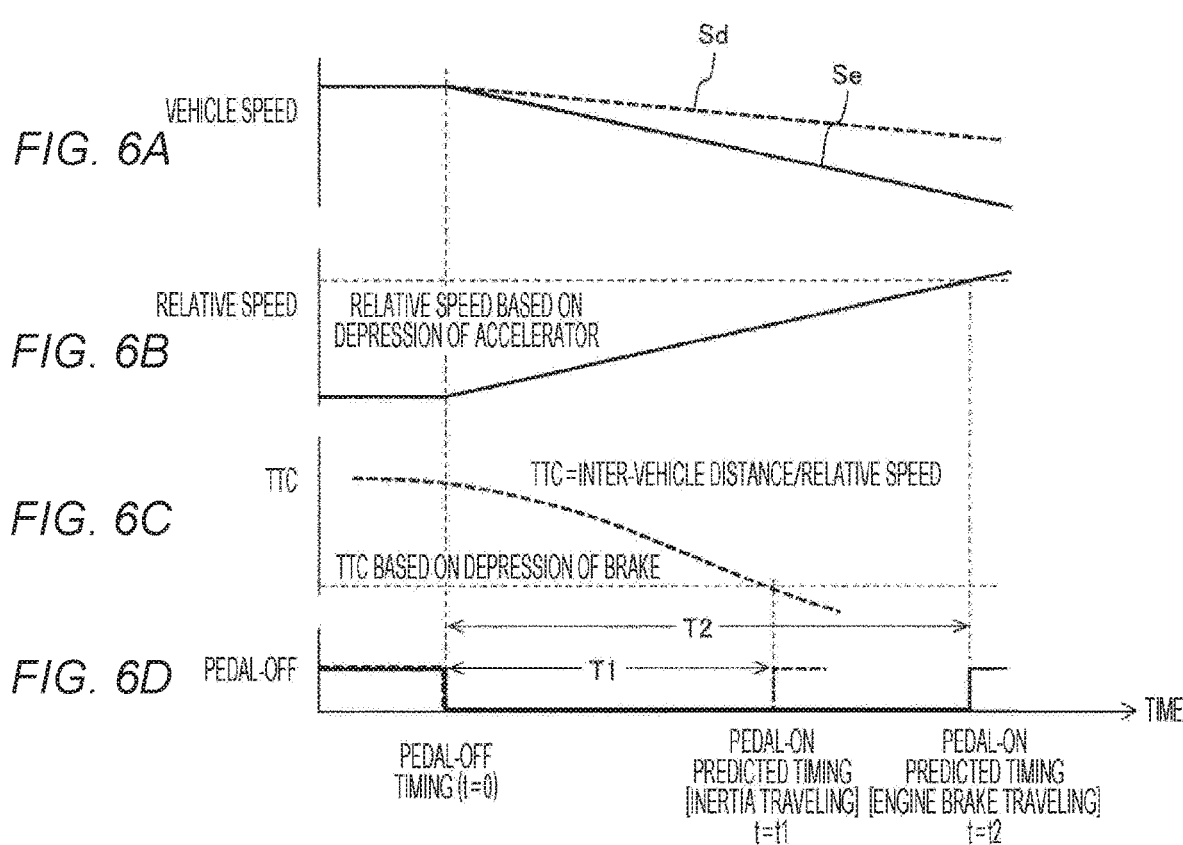

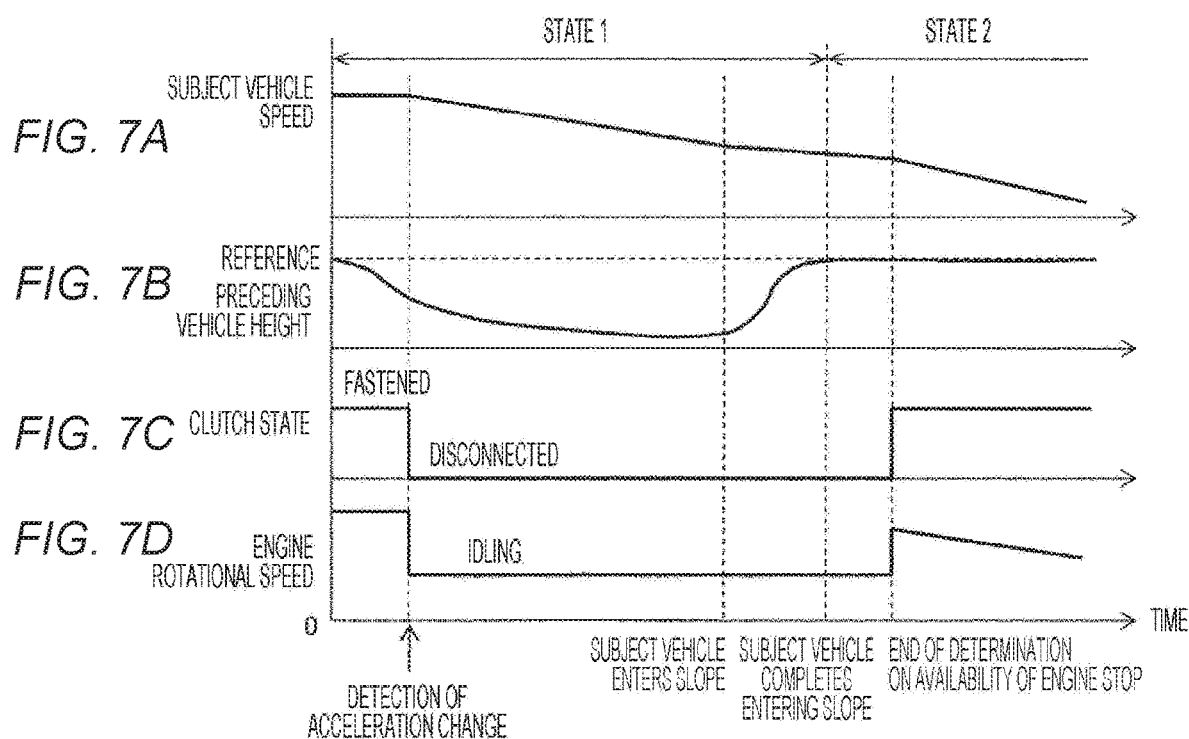

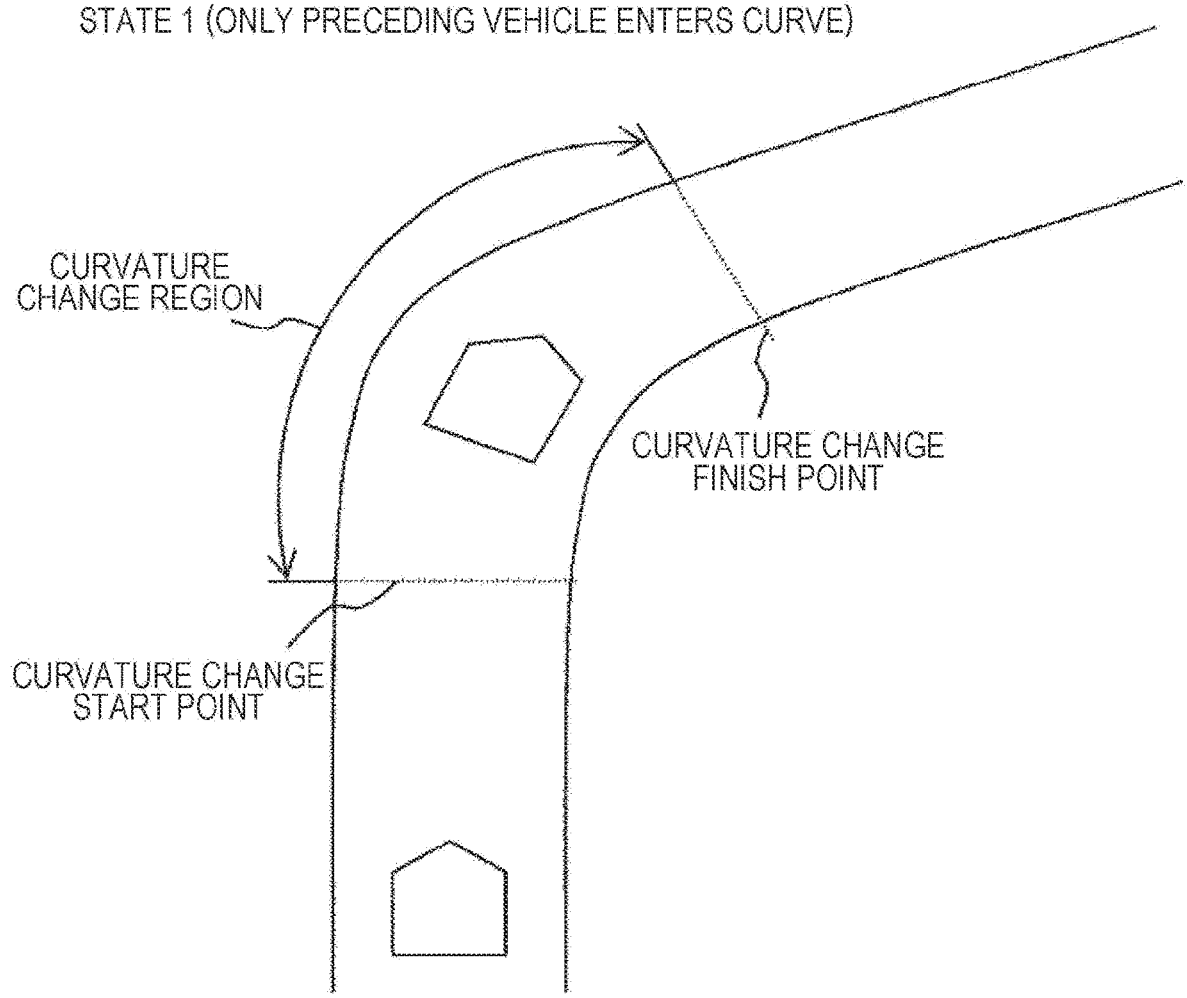

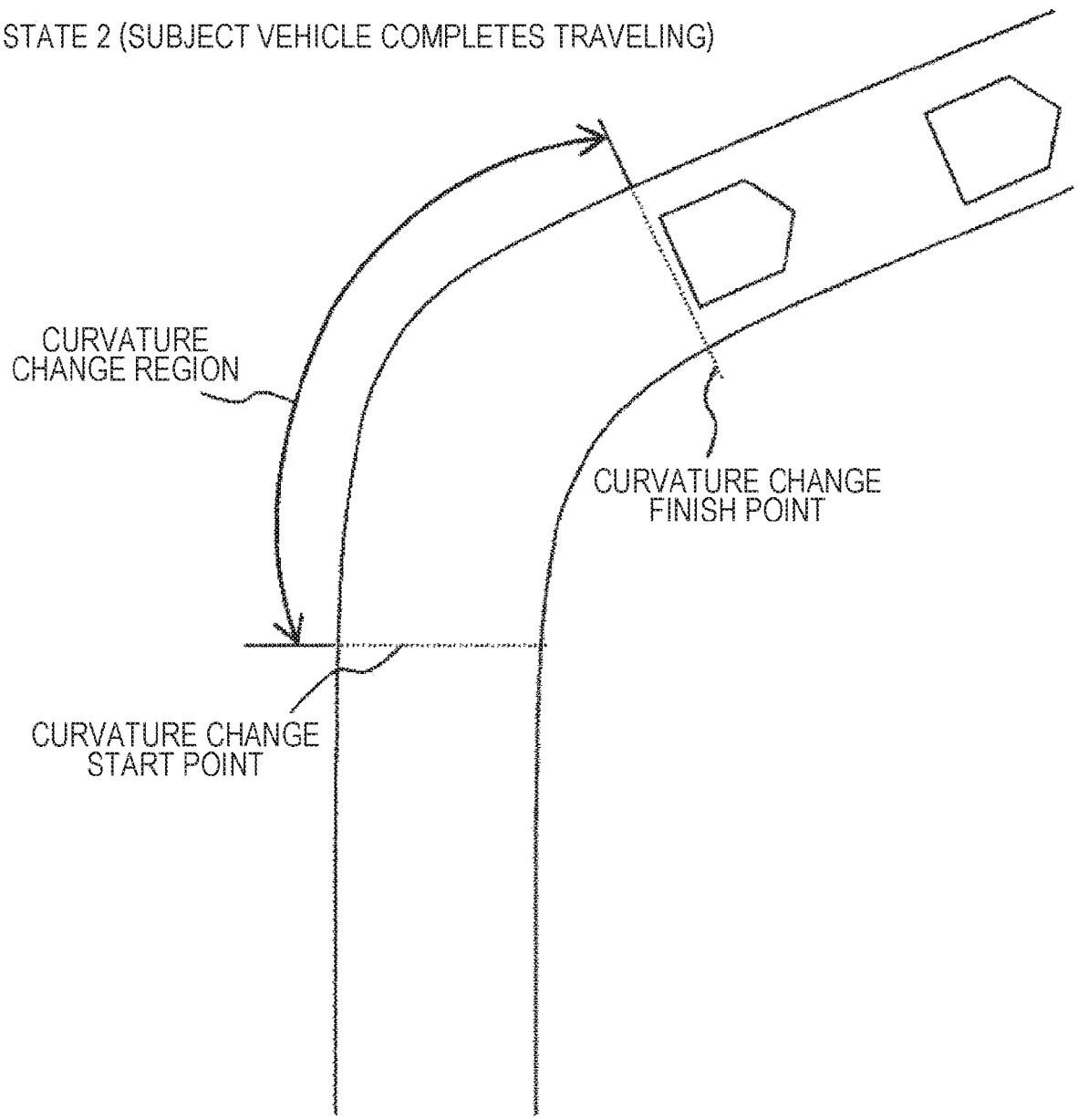

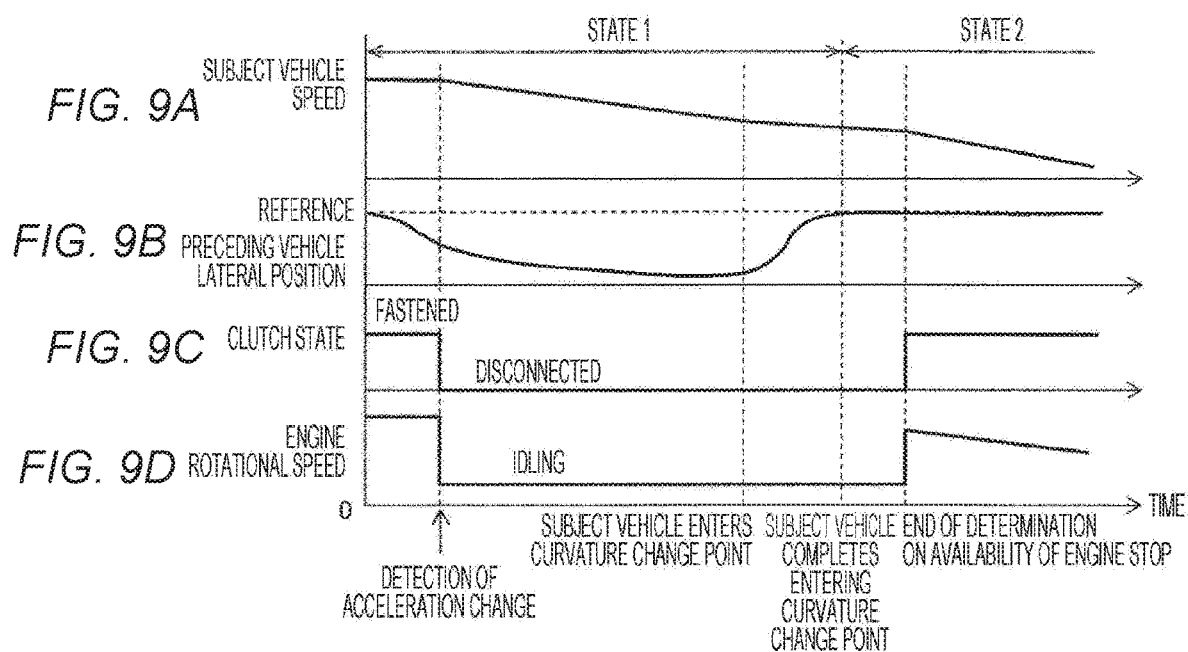

CONTROL APPARATUS FOR VEHICLE

TECHNICAL FIELD

The present invention relates to a control apparatus for a vehicle, and particularly to a control apparatus for a vehicle having an automatic stop and restart function for automatically stopping and restarting an engine.

BACKGROUND ART

In recent years, vehicles equipped with an automatic stop and restart control system for an engine have been increasing for the purpose of improving fuel economy, reducing exhaust emissions, or the like. A typical automatic stop and restart control system of the related art is configured so as to automatically stop an engine by stopping fuel injection and spark ignition when a driver stops a vehicle, and thereafter, to restart the engine by automatically energizing a starter or a motor serving as the starter and cranking the engine when the driver performs an operation (a brake release operation, an accelerator depression operation, or the like) to start the vehicle.

Further, lately, executed is control of temporarily stopping an engine when a certain predetermined condition is satisfied during traveling, disconnecting a clutch, interposed between an automatic transmission and the engine, to drive a vehicle by inertia, and then, restarting the engine when a predetermined condition is satisfied, and re-fastening the clutch (hereinafter, referred to as engine stop and inertia traveling control). In this manner, it is possible to maintain vehicle speed by stopping the engine over a long period of time in the state of not depressing an accelerator pedal, so that improvement in fuel economy can be expected.

Such engine stop and inertia traveling control is described, for example, in JP 2007-291919 A (PTL 1). PTL 1 describes a technique of causing a vehicle to perform inertia traveling without starting generation of a driving force while the vehicle is traveling a downward slope when an inter-vehicle distance between a subject vehicle and a preceding vehicle becomes larger than a maximum inter-vehicle distance.

CITATION LIST

Patent Literature

PTL 1: JP 2007-291919 A

SUMMARY OF INVENTION

Technical Problem

Meanwhile, the above-described engine stop and inertia traveling control is effective in terms of improving the fuel economy, but the number of restarts in the lifetime of the vehicle increases so that an adverse effect on auxiliary components such as a starter and a battery becomes great. Accordingly, it is more desirable to reduce the number of stops and restarts by avoiding the stop and restart of the engine as much as possible unless the condition that the fuel economy is reliably improved is established.

Further, the drive of the engine is stopped using information on the slope on which the subject vehicle is traveling in PTL 1, and thus, there is a high possibility that it is necessary to restart the engine when the slope changes during the inertia traveling and the preceding vehicle has accelerated, which newly causes a problem that the number of restarts of the engine increases. Accordingly, there is a strong request for development of a control technique of improving the fuel economy while performing the engine stop and inertia traveling control, and further, reducing the number of stops and restarts of the engine as much as possible.

An object of the present invention is to provide a novel control apparatus for a vehicle that is capable of reducing the number of stops and restarts while performing engine stop and inertia traveling control.

Solution to Problem

A feature of the present invention is that only a clutch is disconnected and the engine is continuously driven at a predetermined rotational speed when a probability of restarting an engine under the state of performing engine stop and inertia traveling control is high. Incidentally, the predetermined rotational speed is preferably an idle rotational speed, which makes it possible to further reduce fuel economy.

Advantageous Effects of Invention

According to the present invention, the clutch is disconnected to perform inertia traveling and the engine is in a driven state, for example, when it is determined that the probability of restarting the engine is high as an acceleration of a subject vehicle or a preceding vehicle changes, and thus, it is unnecessary to restart the engine and it is possible to suppress the number of restarts.

BRIEF DESCRIPTION OF DRAWINGS

FIGS. 6A to 6D are explanatory views for describing a pedal-off duration of the control flow illustrated in FIGS. 3A-3C.

FIGS. 7A to 7D are explanatory views for describing an overall behavior of the vehicle when the control flow illustrated in FIGS. 3A-3C are executed.

FIG. 8A relates to a second embodiment of the present invention, and is an explanatory view illustrating a state where a subject vehicle is positioned in front of the vicinity of a curvature change region of a traveling road and a preceding vehicle enters the traveling road in the curvature change region.

FIG. 8B is an explanatory view illustrating a state where both the subject vehicle and the preceding vehicle exit from the curvature change region.

FIGS. 9A to 9D are explanatory views for describing an overall behavior of the vehicle when the control according to the second embodiment is executed.

DESCRIPTION OF EMBODIMENTS

Hereinafter, embodiments of the present invention will be described in detail with reference to the accompanying drawings, but the present invention is not limited to the following embodiments, and various modifications and applications that fall within the technological concept of the present invention will be also included in the scope of the present invention.

First Embodiment

Figure 1:
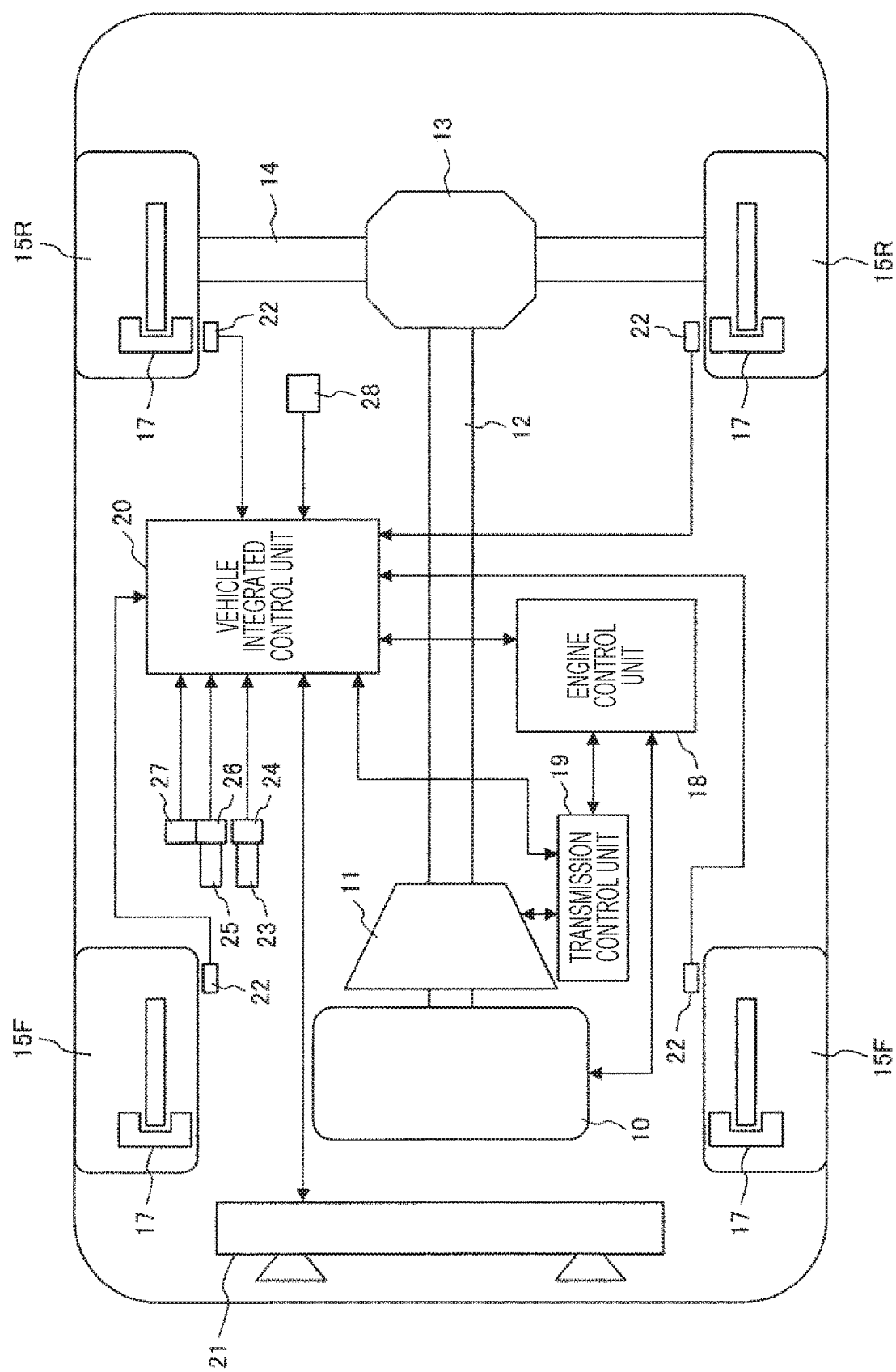
FIG. 1 is a configuration diagram illustrating a schematic configuration of a vehicle to which the present invention is applied.

FIG. 1 illustrates a schematic configuration of a drive system of a vehicle which includes: an in-cylinder injection type engine 10 as a traveling power source; an automatic transmission 11 that adjusts a rotational force of the engine 10 by a speed change mechanism; a propeller shaft 12 that transmits the rotation of the automatic transmission 11 to wheels; a differential gear 13 connected to the propeller shaft 12; a drive shaft 14 connected to the differential gear 13; rear wheels 15R driven by the drive shaft 14; front wheels 15F steered by a steering device; and a friction brake 17 provided on each of the wheels 15F and 15R.

Here, a clutch mechanism (not illustrated) is interposed between the engine 10 and the automatic transmission 11 such that the rotation of the engine 10 is transmitted to the automatic transmission 11 by fastening the clutch and the rotation of the engine 10 is not transmitted to the automatic transmission 11 by disconnecting the clutch.

The engine 10 is controlled by an engine control unit 18, and the automatic transmission 11 is controlled by a transmission control unit 19. Incidentally, the above-described clutch mechanism is also controlled by the transmission control unit 19. The engine control unit 18 and the transmission control unit 19 are communicated with each other via a communication line.

Further, the engine control unit 18 and the transmission control unit 19 are communicated with a vehicle integrated control unit 20 via a communication line. Information from an outside world recognition means 21, wheel speed sensors 22 that detects the rotational speed of the wheels 15F and 15R, an accelerator pedal sensor 24 that detects depression of the accelerator pedal 23, a brake pedal sensor 26 that detects depression of the brake pedal 25, a direction indicator signal 27, a gyro sensor 28 and the like is input to the vehicle integrated control unit 20.

Figure 2:
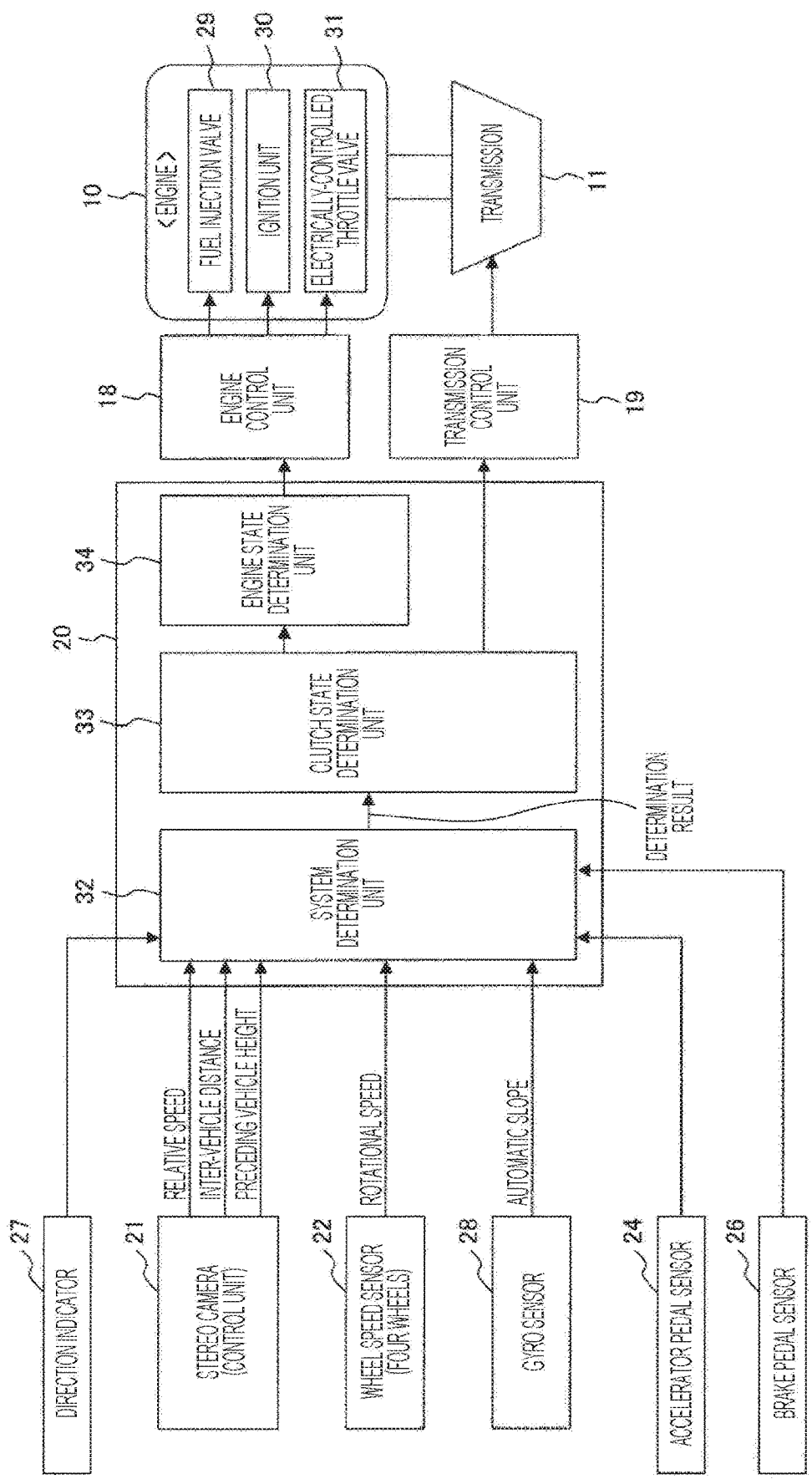
FIG. 2 is a configuration diagram illustrating an internal configuration of a control apparatus for the vehicle illustrated in FIG. 1.

Next, details of the vehicle integrated control unit 20 will be described with reference to FIG. 2. In FIG. 2, the respective control units, such as the vehicle integrated control unit 20, the engine control unit 18, and the transmission control unit 19, incorporating a microcomputer are configured to transfer control information via the communication line. In addition, actuators and devices including the respective control units and sensors to be described later are capable of exchanging the control information via in-vehicle LAN (CAN).

The outside world recognition means 21 has a control unit section incorporating a microcomputer, and the control unit section calculates various types of information, such as a relative speed between a preceding vehicle ahead of a subject vehicle and the subject vehicle, a distance between the subject vehicle and each of the preceding vehicle ahead of the subject vehicle, an obstacle, an oncoming vehicle, and the like (inter-vehicle distance and the like), a height of the preceding vehicle in a vertical direction from a road surface of a traveling road, and a difference in position in a lateral direction, based on a photographed image and transmits a result of the calculation to the vehicle integrated control unit 20.

One or a plurality of elements among a laser radar, a millimeter wave radar, a mono camera, a stereo camera and the like may be used in combination as the outside world recognition means 21. In addition, the outside world recognition means 21 may be acquired using road-to-vehicle communication or inter-vehicle communication. The stereo camera is used in the present embodiment.

In addition, information from the four wheel speed sensors 22 that detect the rotational speed of the respective wheels 15F and 15R, the accelerator pedal sensor 24 that detects depression of the accelerator pedal 23, the brake pedal sensor 26 that detects depression of the brake pedal 25, the direction indicator signal 27, the gyro sensor 28 and the like is also input to the vehicle integrated control unit 20.

Not only the control information from the vehicle integrated control unit 20, the transmission control unit 14, and the like, but also various types of information indicating operation states of the engine 10 from the sensors arranged in the engine 10 (for example, engine speed, the amount of intake air, a throttle opening degree, in-cylinder pressure, and the like) or serving as a basis at the time of obtaining these operation states are input to the engine control unit 18. In addition, the engine control unit 18 transmits a predetermined drive signal to a fuel injection valve 29, an ignition unit 30 formed of an ignition coil and an ignition plug, an electrically controlled throttle valve 31, and the like based on these pieces of information to execute fuel injection (timing and amount) control, ignition (an energization angle and ignition timing) control, throttle opening degree control, and the like.

Here, engine stop and inertia traveling control is executed in the present embodiment, and thus, control at a pedal-off state where the accelerator pedal 23, and the brake pedal 25 are not depressed is given as a premise.

The vehicle integrated control unit 20 includes a system determination unit 32, a clutch state determination unit 33, and an engine state determination unit 34, which are related to the present embodiment. The system determination unit 32, the clutch state determination unit 33, and the engine state determination unit 34 function as an automatic stop and restart means.

The system determination unit 32 calculates speed of the subject vehicle and a depression amount of the accelerator pedal based on the information from the four wheel speed sensors 22 and the accelerator pedal sensor 24. Further, the system determination unit 32 calculates deceleration necessary for quickly performing collision avoidance or the like of the subject vehicle (hereinafter, referred to as a required deceleration) based on information on a relative relationship (for example, a relative speed, a relative distance, and the like) with the preceding vehicle obtained from the accelerator pedal sensor 24, the direction indicator 27, the brake pedal sensor 26, and the outside world recognition sensor 21. Then, it is determined that deceleration assist by an engine brake is necessary if the required deceleration is equal to or greater than a predetermined value (for example, deceleration estimated to be generated by the engine brake).

On the other hand, it is determined that the engine brake is unnecessary if the required deceleration is equal to or less than the predetermined value, when the vehicle speed of the subject vehicle is equal to or higher than a predetermined value based on such determination, time from a timing (pedal-off timing) at which the accelerator pedal 23 is no longer depressed until the accelerator pedal 23 or the brake pedal 25 is depressed is calculated in each case of performing (1) engine brake traveling in a state where the clutch is fastened; (2) inertia traveling in a state where the clutch disconnected (hereinafter, collectively referred to as pedal-off duration). This calculation will be described with reference to a flowchart to be described later.

In addition, a probability that an acceleration of the subject vehicle or the preceding vehicle changes (=a probability of restarting the engine) is determined in a state where the accelerator pedal 23 and the brake pedal 25 of the subject vehicle are not depressed. Incidentally, the probability referred to herein means a degree of certainty.

Then, these results are transmitted to the clutch state determination unit 33 and the engine state determination unit 34. For example, a case where the vehicle travels on a traveling road with a downward slope is assumable as a case where the subject vehicle accelerates in the state where the accelerator pedal 23 and the brake pedal 25 of the subject vehicle are not depressed. In addition, a case where the preceding vehicle is accelerated by a driver thereof is assumable as a case where the preceding vehicle accelerates.

Incidentally, the acceleration of the subject vehicle or the preceding vehicle may change due to factors other than these factors. In short, it is enough as long as the probability of change of the acceleration is determined by detecting an event of change of the acceleration of the subject vehicle or the preceding vehicle. Here, the case where the acceleration changes also includes a case where a vehicle is decelerated.

The clutch state determination unit 33 has a function of determining to permit clutch disconnection (release) when it is determined that a pedal-off duration in the case of performing the inertia traveling is longer than a pedal-off duration in the case of performing the engine brake traveling in a state where the accelerator pedal 23 is not depressed and it is determined that the engine brake traveling is unnecessary.

In addition, the clutch state determination unit 33 has a function of determining that a clutch fastening condition is satisfied when (1) it is determined that the accelerator pedal 23 is depressed, (2) it is determined that the deceleration assist by the engine brake is necessary, or (3) it is determined that the pedal-off duration in the case of performing the inertia traveling is shorter than the pedal-off duration in the case of performing the engine brake traveling.

When the accelerator pedal 23 is not depressed and the clutch state determination unit 33 has not performed the determination on the permission of clutch disconnection, the engine state determination unit 34 determines that a fuel stop condition is satisfied. Accordingly, it is possible to select the engine brake traveling when relatively strong deceleration is required to avoid a collision with the preceding vehicle or when the pedal-off duration in the case of engine brake traveling is longer than the pedal-off duration in the case of inertia traveling. Here, the pedal-off duration is a fuel stop time, and the expression that the pedal-off duration in the case of engine brake traveling is long means that an effect of improving fuel economy through the engine brake traveling is greater than an effect of improving fuel economy through the inertia traveling.

In addition, when the system determination unit 51 determines that the accelerator pedal 23 and the brake pedal 25 are not depressed by the system determination unit 51 and the clutch state determination unit 33 determines to permit the clutch disconnection, the engine state determination unit 34 determines a probability of the probability of change of the acceleration of the subject vehicle or the preceding vehicle during the pedal-off of the subject vehicle. When it is determined that the probability that the acceleration changes is high, the combustion of the engine is continued in the state of disconnecting the clutch.

Regarding the probability of change of the acceleration, for example, a situation where the subject vehicle and the preceding vehicle enters a downhill is considered as a case where it is considered that the probability that the acceleration changes is high in the present embodiment. That is, in a method of the related art, speed of a subject vehicle increases when the vehicle enters a downhill in the state of performing deceleration fuel cut by accelerator-off, and an engine is restarted as a condition of the deceleration fuel cut is changed by depressing a brake pedal. Thus, the probability of change of the acceleration where the restart is necessary is determined in order to suppress the number of restarts of the engine in the present embodiment.

In addition, it is also considered that the probability that the acceleration changes is high even in the case of entering a curvature change region of a curved road, and this will be described in a second embodiment to be described later. The description regarding on the determination on the probability that the acceleration changes according to the first embodiment and the second embodiment to be described later is mere exemplary, and it is needless to say that the probability that the acceleration changes may be determined using parameters other than the above-described one.

On the other hand, when it is determined that the probability that the acceleration changes is low, the rotation of the engine is completely stopped by stopping the combustion supply to the engine in the state of disconnecting the clutch.

Through these processes, it is possible to improve the effect of improving the fuel economy since the engine is stopped when the probability that the acceleration changes is low by determining the probability that the acceleration changes during the inertia traveling. In addition, it is possible to reduce the number of stops and restarts of the engine and it is possible to increase the service life of auxiliary components since the engine is not stopped when the probability that the acceleration changes is high.

When a clutch disconnection command is transmitted from the clutch state determination unit 33, the transmission control unit 19 immediately disconnects the clutch to decrease the deceleration of the subject vehicle and implements the inertia traveling state. On the other hand, when a clutch fastening command is transmitted from the clutch state determination unit 33, the transmission control unit 19 maintains fastening of the clutch or immediately fastens the clutch after waiting until the rotation of the engine and the rotation of the wheels are synchronized if the clutch has been disconnected. Accordingly, it is possible to execute the engine brake traveling or to set a driving state where a driving force of the engine is transmitted to the wheels.

When an engine stop command is transmitted from the engine state determination unit 34, the engine control unit 18 operates to stop the engine 10 by stopping supply of a fuel injection drive pulse signal to the fuel injection valve 29 and stopping supply of an ignition signal to the ignition unit 30. When an engine restart command is transmitted from the engine state determination unit 34, the engine control unit 18 operates to restart the engine 10 by restarting the supply of the fuel injection drive pulse signal to the fuel injection valve 29 and restarting the supply of the ignition signal to the ignition unit 30.

The system determination unit 32, the clutch state determination unit 33, and the engine state determination unit 34 of the vehicle integrated control unit 20 described above practically control functions of a control program that is executed by the microcomputer, and thus, specific control will be described next with reference to a control flow illustrated in FIGS. 3A-3C.

Figure 3A:
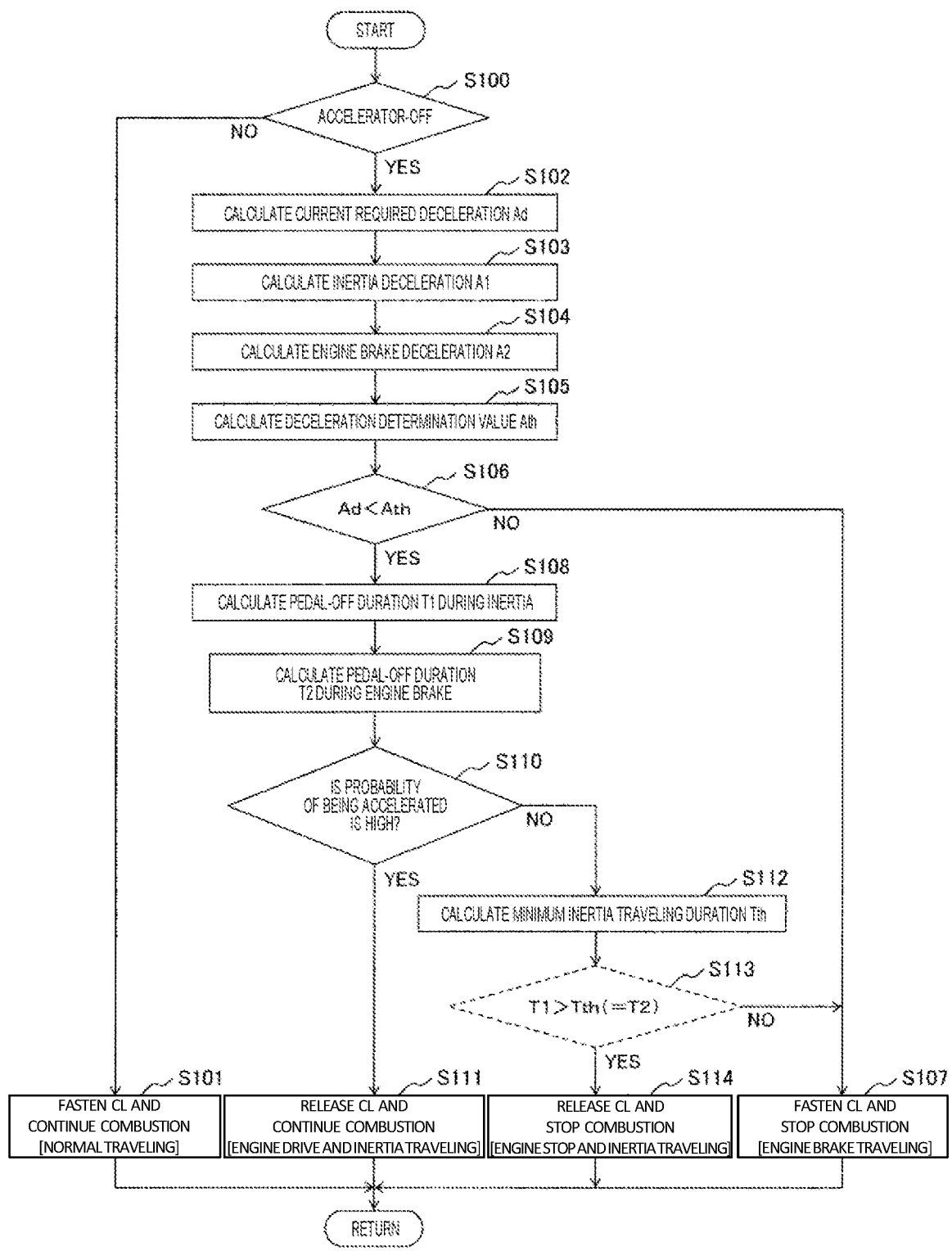
FIGS. 3A-3C are flowcharts illustrating a specific control flow of a control apparatus for a vehicle according to a first embodiment of the present invention.
Figure 3B:
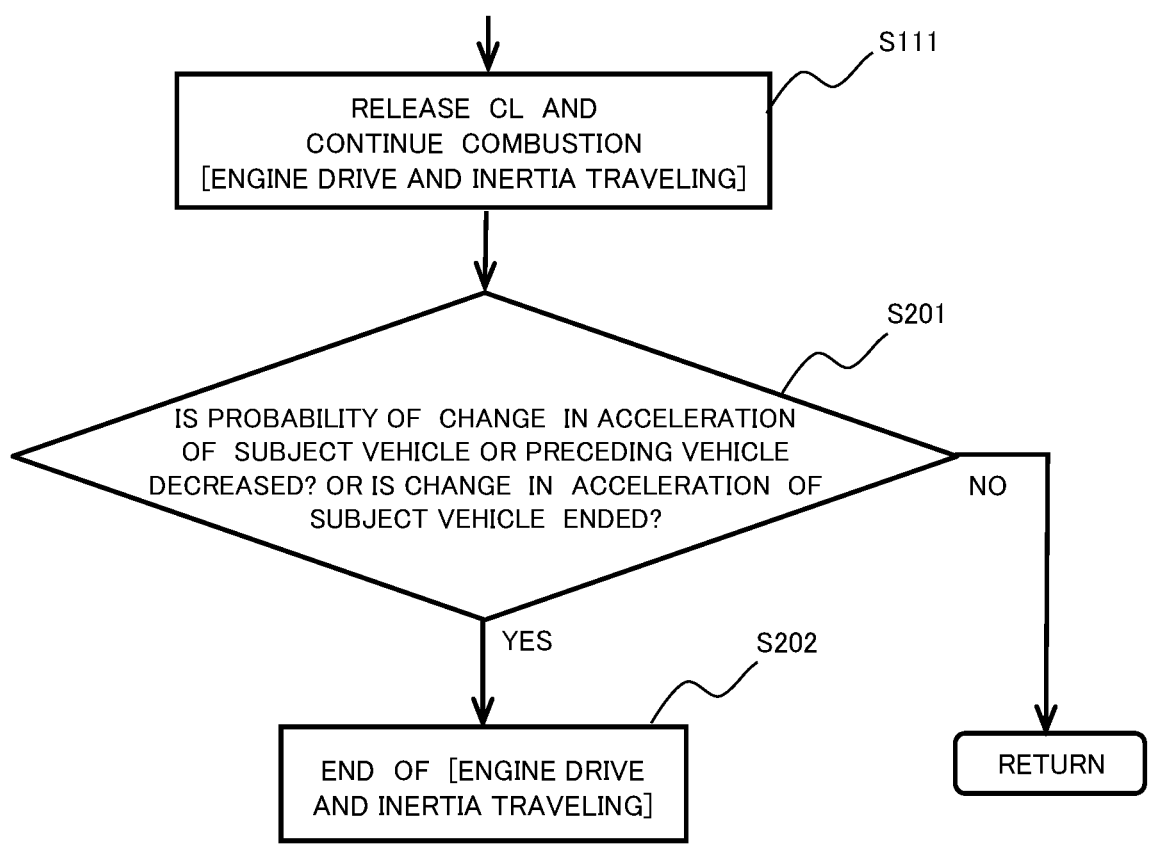
Figure 3C:
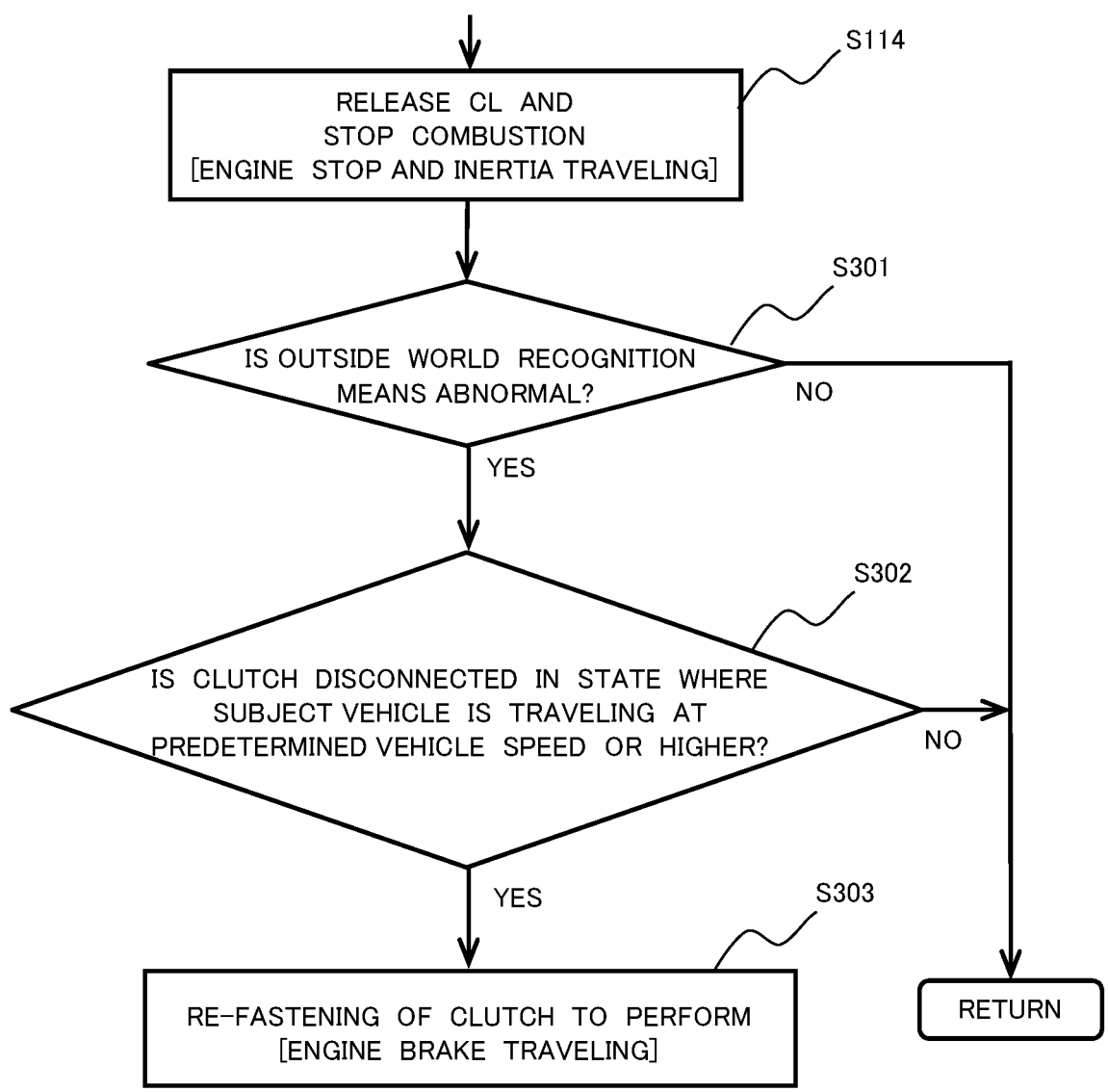

Incidentally, the control flow illustrated in FIGS. 3A-3C are activated at an activation timing every predetermined time such that each control step from the start to the return is executed, and then, the respective control steps from the start to the return are repeatedly executed again at the arrival of the next activation timing. This activation timing is activated every predetermined time, for example, by compare match interrupt of a free run counter.

Figure 4A:
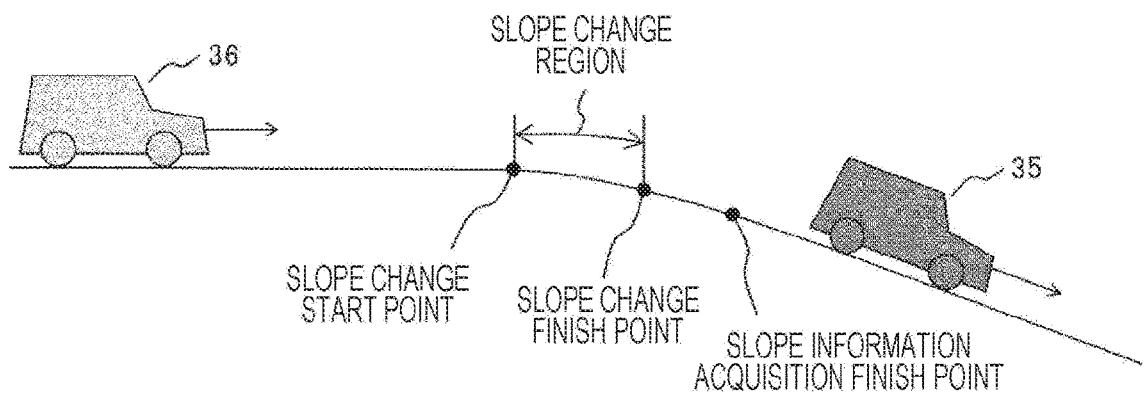
FIG. 4A is an explanatory view for describing a state where the subject vehicle is positioned in front of a downward slope and a preceding vehicle enter a traveling road with the downward slope.
Figure 4B:
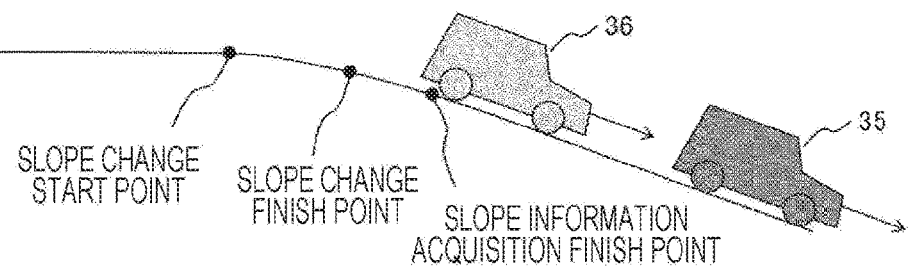
FIG. 4B is an explanatory view for describing a state where both of the subject vehicle and the preceding vehicle enter the traveling road with the downward slope.

In the present embodiment, an object to be controlled is a state where a traveling road with a downward slope is present in front of a subject vehicle 36 and a preceding vehicle 35 in a state where the subject vehicle 36 is traveling following the preceding vehicle 35, and the vehicles are traveling on this traveling road as illustrated in FIGS. 4A and 4B. For convenience of description, a slope change start point, a slope change finish point, and a slope information acquisition finish point are set on the traveling road for convenience, and the slope change start point, the slope change finish point, and the slope information acquisition finish point are recognized by the outside world recognition means 21.

FIG. 4A illustrates a state where the subject vehicle 36 has not yet entered the traveling road with the downward slope and the preceding vehicle 35 has entered the traveling road with the downward slope. Further, FIG. 4A illustrates a state where the preceding vehicle 35 is being accelerated because of entering the downward slope and a distance between the subject vehicle 36 and the preceding vehicle 35 is being increased.

FIG. 4B illustrates a state where the subject vehicle 36 has entered the traveling road with the downward slope and the preceding vehicle 35 is traveling on the traveling road with the downward slope. Further, FIG. 4B illustrates a state where the subject vehicle 36 is being accelerated because of entering the downward slope and the distance between the subject vehicle 36 and the preceding vehicle 35 is being decreased.

An operation of the vehicle integrated control unit 20 in such a state will be described with reference to the control flow illustrated in FIGS. 3A-3C.

<<Step S100>>

In Step S100, information on the accelerator depression amount is acquired in order to determine a traveling state of the vehicle. When it is determined that the accelerator pedal is depressed, it is determined that a driver is performing normal traveling and the processing proceeds to Step S101 without executing an automatic stop and restart function of automatically stopping and restarting the engine. On the other hand, when it is determined that the accelerator pedal is not depressed in Step S100, processes of Step S102 and the subsequent steps are executed to execute the automatic stop and restart function of automatically stopping and restarting the engine, and a clutch disconnection and fastening function.

<<Step S101>>

When it is determined that the accelerator pedal 23 is depressed in Step S100, the normal traveling in which the clutch is fastened to continue the combustion of the engine is executed in Step S101, and then, the control returns to the return to be prepared for the next activation timing.

<<Step S102>>

Figure 5:
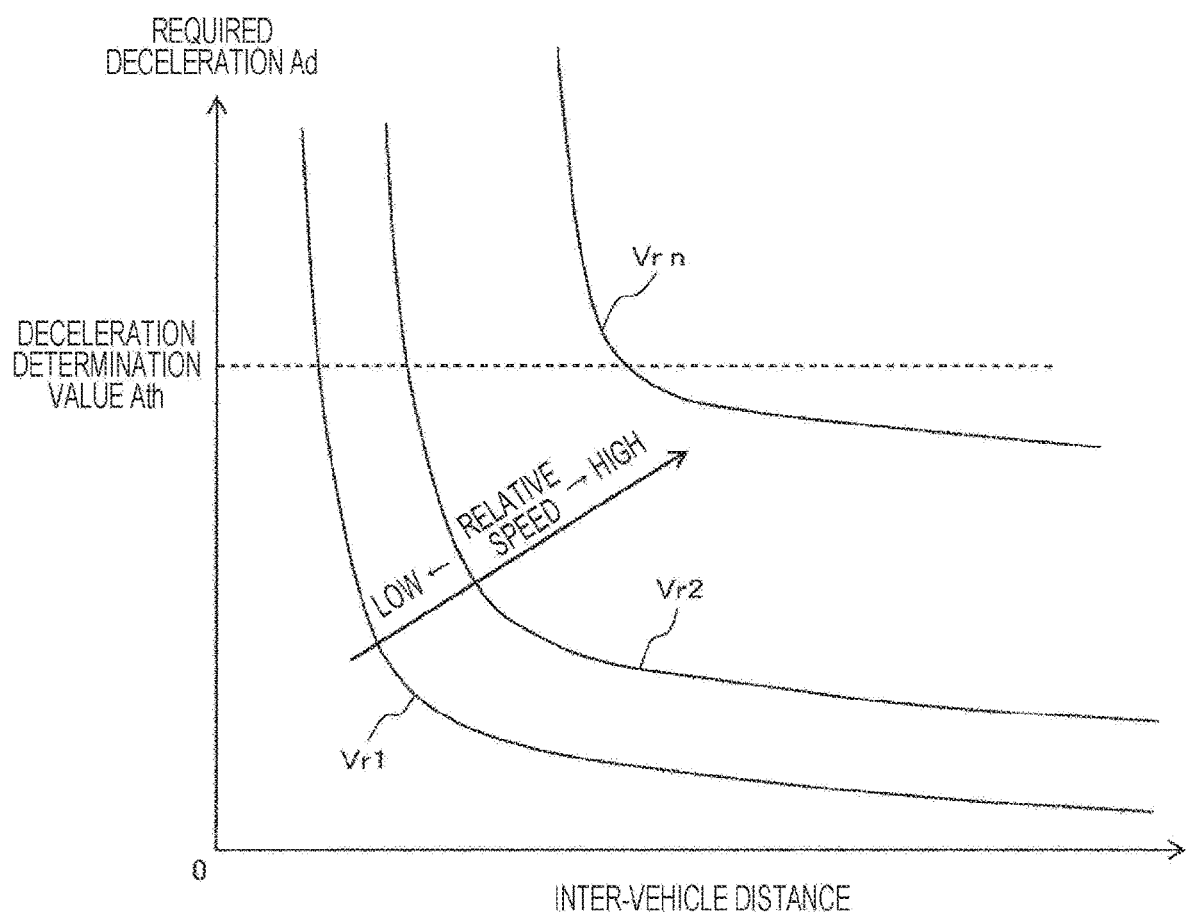
FIG. 5 is a view illustrating a deceleration map in a case where a required deceleration is obtained from an inter-vehicle distance and relative speed of the subject vehicle and the preceding vehicle.

In Step S102, a current required deceleration Ad required for the subject vehicle 36 is calculated based on a depression amount of the brake pedal of the subject vehicle and current relative speed and relative distance between the subject vehicle 36 and the preceding vehicle 35 such that the subject vehicle promptly performs deceleration traveling including the collision avoidance. As illustrated in FIG. 5, the required deceleration Ad is obtained using a deceleration map that is determined based on an inter-vehicle distance between the subject vehicle 36 and the preceding vehicle 35 and a relative speed Vr.

The required deceleration is determined at each relative speed Vr based on each inter-vehicle distance and each of relative speeds Vr1 to Vrn, and the required deceleration decreases as the inter-vehicle distance increases and the required deceleration increases as the relative speed increases (the speed of the subject vehicle increases). Incidentally, this deceleration map is exemplary, and a deceleration map using other parameters may be used. Further, the depression amount of the brake may be referred to. In addition, when the preceding vehicle 35 is not detected and there is no depression of the brake pedal 25, the required deceleration Ad is set to a predetermined small required deceleration Ad or "0". When this process is completed, the processing proceeds to Step S103.

<<Step S103>>

In Step S103, an inertia deceleration A1 of the subject vehicle in a case where the subject vehicle performs the inertia traveling is estimated and calculated in a state where the accelerator pedal 23 and the brake pedal 25 are not depressed and the clutch is disconnected. In a method of this estimation and calculation, a traveling resistance is obtained using one or more parameters among vehicle weight, a Cd value, a slope, and the like of the subject vehicle, and the estimation is performed based on this traveling resistance and the vehicle speed information of the subject vehicle.

Alternatively, the vehicle speed of the subject vehicle and the deceleration during the inertia traveling may be mapped by adaptation work, and the inertia deceleration A1 may be estimated by referring to the vehicle speed. In addition, the inertia deceleration A1 may be estimated from the deceleration during the previous inertia traveling. Further, when it is possible to acquire correction information such as the number of occupants and the air pressure of the wheel, the inertia deceleration A1 may be corrected using such correction information. When this process is completed, the processing proceeds to Step S104.

<<Step S104>>

In Step S104, an engine brake deceleration A2 in a case where the subject vehicle performs the engine brake traveling is estimated and calculated in a state where the accelerator pedal 23 and the brake pedal 25 are not depressed and the clutch is fastened. In a method of this estimation and calculation, the engine brake deceleration A2 is estimated by adding a predetermined value to the inertia deceleration A1 estimated in Step S103.

In addition, a resistance force acting on the wheel may be estimated and calculated based on a relationship between the vehicle speed and a state of charge (SOC) of the battery or based on a map having the vehicle speed and the SOC of the battery as parameters, and the engine brake deceleration A2 of the subject vehicle may be estimated using these. It is well-known that the engine brake deceleration A2 is a greater deceleration than the inertia deceleration A1. When this process is completed, the processing proceeds to Step S105.

<<Step S105>>

In Step S105, a deceleration determination value Ath with which it is estimated that the driver does not feel strange about the deceleration of the inertia traveling is calculated. The deceleration determination value Ath is a threshold configured to perform determination on whether a current deceleration state of the subject vehicle is preferably shifted to the inertia traveling or to the engine brake traveling. As illustrated in FIG. 5, this deceleration determination value Ath serves as a reference to perform rapid deceleration when the required deceleration Ad is greater than the deceleration determination value Ath and to perform slow deceleration when the required deceleration Ad is smaller than the deceleration determination value Ath. In the present embodiment, the inertia deceleration A1 obtained in Step S103 is replaced with the deceleration determination value Ath to be set as a threshold for comparison in the next Step S105. Hereinafter, the deceleration determination value Ath will be described as the inertia deceleration A1.

Incidentally, when there is a slope in a downward direction relative to a slope on which the subject vehicle is traveling, that is, a slope change region (from the slope change start point to the slope change finish point) in which the deceleration of the subject vehicle is likely to be decreased, and then, accelerated in front of the subject vehicle in a state where the inertia deceleration A1 of the traveling road on which the subject vehicle is currently traveling is "0", that is, the subject vehicle 36 does not accelerate nor decelerate during the inertia traveling as illustrated in FIG. 4A, a deceleration operation of the subject vehicle after passing through the slope change region is predicted so that the required deceleration Ath may be set to "0".

Incidentally, when the required deceleration Ath is set to "0", the engine brake traveling is immediately selected in the subject vehicle in the next Step S106. Thus, it is possible to save the amount of fuel to be consumed by a degree of not driving the engine (deceleration fuel cut) as compared with a case where the inertia traveling is performed while driving the engine until entering the downward slope. When this process is completed, the processing proceeds to Step S106.

<<Step S106>>

In Step S106, the required deceleration Ad obtained in Step S103 is compared with a magnitude of the deceleration determination value Ath obtained in Step S106, and the processing proceeds to Step S107 when it is determined that the current required deceleration Ad is greater than the deceleration determination value Ath (=A1), and the processing proceeds to Step S108 when it is determined that the current required deceleration Ad is smaller than the deceleration determination value Ath (=A1). Basically, the case of proceeding to Step S107 corresponds to the engine brake traveling where the deceleration is large, and the case of proceeding to Step S108 corresponds to the inertia traveling where the deceleration is small. Incidentally, any one of "engine drive and inertia traveling control" in which the inertia traveling is performed while driving the engine in the state where the clutch is disconnected and "engine stop and inertia traveling control" in which the inertia traveling is performed without driving the engine in the state where the clutch is disconnected is executed in the case of shifting to the inertia traveling.

<<Step S107>>

When it is determined that the required deceleration Ad is greater than the deceleration determination value Ath (=A1), "engine brake traveling control" is executed in Step S107. In the "engine brake traveling control", the drive of the engine is stopped (deceleration fuel cut) in a state where the clutch is fastened, and thus, it is possible to execute rapid deceleration in response to the required deceleration Ad. This prevents the driver from feeling uncomfortable in the deceleration state caused by executing the small deceleration during the inertia traveling, and it is possible to provide deceleration traveling without any uncomfortable feeling through the engine brake. Further, the control returns to the return after executing the "engine brake traveling control" in Step S107 to be prepared for the next activation timing.

<<Step S108>>

When it is determined in Step S107 that the required deceleration Ad is smaller than the deceleration determination value Ath (=A1), a pedal-off duration T1 in which the inertia traveling can be continued when the subject vehicle 36 performs the inertia traveling is estimated and calculated in Step S109.

A method of calculating the pedal-off duration is illustrated in FIG. 6. A timing at which the accelerator-off has occurred is set to t=0, and a change in vehicle speed of the subject vehicle 36 is predicted using the inertia deceleration A1 obtained in Step S103. The vehicle speed during the inertia traveling changes as represented by a vehicle speed Sd with the elapse of time as indicated by the broken line in (a) of FIG. 6.

In addition, changes in relative speed and inter-vehicle distance are predicted from the information, such as the vehicle speed, the acceleration, and the inter-vehicle distance of the preceding vehicle 35 obtained using the outside world recognition sensor 21. Time taken until the subject vehicle 36 depressed on the brake pedal 25 next is calculated using these pieces of information. The vehicle speed of the subject vehicle 36 is faster in the inertia traveling than in the engine brake traveling since the clutch is disconnected, and the inter-vehicle distance between the subject vehicle 36 and the preceding vehicle 35 tends to be shortened so that the brake pedal 25 is highly likely to be depressed in the subject vehicle 36.

Further, a condition of depression of the brake pedal 25 in the subject vehicle 36 is estimated such that the depression of the brake pedal 25 is performed in a situation where a time-to-collision (TTC) is equal to or shorter than a predetermined value (brake depression reference TTC) as indicated by the broken line in (c) of FIG. 6, for example, and it is estimated that it is necessary to rapidly perform deceleration in order to avoid the collision. Here, the TTC is obtained by the formula of TTC=inter-vehicle distance/relative speed.

Therefore, when it is assumed that the inertia traveling has been performed after the accelerator-off (t=0), time until a timing (t=t1) at which it is estimated that the brake pedal 25 is depressed next is set as the pedal-off duration time T1. This pedal-off duration T1 and a pedal-off duration T2 to be obtained in the next Step S109 correlate with the fuel cut time during which the drive of the engine is stopped. The longer the pedal-off duration is, the greater the effect of improving the fuel economy is. When this process is completed, the processing proceeds to Step S109.

Incidentally, a case where the accelerator pedal 23 is depressed is also conceivable, and time taken until the accelerator pedal 23 is depressed is calculated in this case.

<<Step S109>>

Similarly to Step S108, the pedal-off duration T2 in which the engine brake traveling can be continued when the subject vehicle 36 performs the engine brake traveling is calculated in Step S109.

A method of calculating the pedal-off duration is illustrated in FIG. 6. A timing at which the accelerator-off has occurred is set to t=0, and a change in vehicle speed of the subject vehicle 36 is predicted using the engine brake deceleration A2 obtained in Step S104. The vehicle speed during the inertia traveling changes as represented by a vehicle speed Se with the elapse of time as indicated by the solid line in (a) of FIG. 6.

In addition, changes in relative speed and inter-vehicle distance are predicted from the information, such as the vehicle speed, the acceleration, and the inter-vehicle distance of the preceding vehicle 35 obtained using the outside world recognition sensor 21. Time taken until the subject vehicle 36 depressed on the accelerator pedal 23 next is calculated using these pieces of information. The vehicle speed of the subject vehicle 36 is slower in the engine brake traveling than in the inertia traveling since the clutch is fastened, and the inter-vehicle distance between the subject vehicle 36 and the preceding vehicle 35 tends to be widened so that the accelerator pedal 23 is highly likely to be depressed in the subject vehicle 36.

Further, a condition of depression of the accelerator pedal 23 in the subject vehicle 36 is estimated such that the depression of accelerator pedal 23 is performed when the relative speed becomes equal to or higher than "0" (accelerator depression reference relative speed), that is, relationship that the vehicle speed of the preceding vehicle □ the vehicle speed of the subject vehicle is set as indicated by the solid line in (b) of FIG. 6, for example.

Therefore, when it is assumed that the engine brake traveling has been performed after the accelerator-off (t=0), time until a timing (t=t2) at which it is estimated that the accelerator pedal 23 is depressed next is set as the pedal-off duration time T2. When this process is completed, the processing proceeds to Step S110.

When the preceding vehicle 35 is not detected in Steps S108 and S109, the determination may be performed such that the time until the vehicle speed of the subject vehicle becomes a predetermined vehicle speed or lower when assuming that the inertia traveling is performed is set as the pedal-off duration T1, and similarly, the time until the vehicle speed of the subject vehicle becomes the predetermined vehicle speed or lower when assuming that the engine brake traveling is performed is set as the pedal-off duration T2. Incidentally, the predetermined vehicle speeds may be different from each other. When this process is completed, the processing proceeds to Step S110.

Incidentally, a case where the brake pedal 25 is depressed is also conceivable, and time taken until the brake pedal 25 is depressed is calculated in this case.

<<Step S110>>

In Step S110, a probability (=probability of restarting the engine) that an event of changing the acceleration of the subject vehicle 36 or the preceding vehicle 35 occurs is determined within the pedal-off duration T1 calculated in Step S108.

In the present embodiment, it is determined that the acceleration of the subject vehicle 36 changes and it is estimated that the probability that the event of changing the acceleration occurs is high when it is estimated that the subject vehicle enters a change region of the downward slope traveling road within the pedal-off duration T1 from the accelerator-off as illustrated in FIGS. 4A and 4B.

Regarding the probability of change of the acceleration, for example, it is considered that the probability that the acceleration changes is high in the situation where the subject vehicle and the preceding vehicle enters the downhill in the present embodiment. That is, the speed of the subject vehicle increases when the vehicle enters the downhill if the fuel cut is performed by the accelerator-off, and the engine is restarted as the condition of the fuel cut is changed by depressing the brake pedal. Thus, the probability of change of the acceleration where the restart is necessary is determined in order to suppress the number of restarts of the engine.

The slope change region can be detected by, for example, the stereo camera which is the outside world recognition sensor 21. That is, it is possible to utilize a change in position of a characteristic part of the preceding vehicle 35, for example, a rear bumper in FIGS. 4A and 4B. Since a lower end position of the rear bumper changes in the vertical direction when the preceding vehicle 35 passes through the slope change start point, the slope change region can be acquired using this change. According to this method, it is possible to acquire information on the slope change region using the outside world recognition sensor 21 so that slope information can be detected without using a navigation device including the slope information.

It is a matter of course that the present invention is not limited to such a method, and presence or absence of the change in slope of the traveling road may be estimated based on a white line on the road (which can be estimated by a disappearance of the white line), or the change in slope of the traveling road may be estimated based on information such as a slope of the traveling road or an altitude from the map information of the navigation device. In addition, the presence or absence and a position of the change in slope of the traveling road may be acquired from other vehicles including the preceding vehicle, the communication infrastructure on the road, and the like by wireless communication.

Further, the determination of the probability of change of the acceleration in Step S110 may be continued even after the subject vehicle 36 has practically passed through the downward slope change region. Accordingly, after the subject vehicle 36 enters the downward slope, it is possible to determine whether to stop the engine after acquiring the information on a gradient of the slope or a change in deceleration of the subject vehicle 36 due to the slope.

When it is determined in Step S110 that an event in which the acceleration of the subject vehicle 36 or the preceding vehicle 35 changes occurs within the pedal-off duration T1, the processing proceeds to Step S111. On the other hand, when it is determined in Step S110 that the event in which the acceleration of the subject vehicle 36 or the preceding vehicle 35 changes does not occur within the pedal-off duration T1, the processing proceeds to Step S112.

<<Step S111>>

Since the probability that the acceleration changes is high, the process of disconnecting the clutch is performed, and the "engine drive and inertia traveling control" to continue the drive of the engine is executed in Step S111. At this time, it is desirable to set the engine to an idle state from the viewpoint of fuel economy, but this can be changed according to a request transmitted from an ECU or the like.

Through this control, when there is the slope change region in front of the subject vehicle 36, the subject vehicle 36 can travel in the inertia traveling state while driving the engine until passing through this change region. Therefore, when it is determined that the probability that the acceleration changes is high, the engine is maintained in the driven state to be prepared. Thus, since the engine is not stopped as in the related art, it is unnecessary to restart the engine, and it is possible to suppress the number of restarts.

In addition, since the above-described control flow is executed at a predetermined activation timing after passing through the slope change region, it is possible to perform the determination on the engine stop again. Thus, it is possible to stop the engine when the possibility of obtaining the fuel economy effect by the inertia traveling is high.

<<Step S112>>

When it is determined in Step S110 that the event in which the acceleration changes does not occur within the pedal-off duration time T1, a minimum inertia traveling duration Tth in which improvement in fuel economy by the inertia traveling can be expected is calculated using pedal-off durations T1 and T2, calculated in Steps S108 and S109, in Step S112.

Regarding the inertia traveling duration Tth, the pedal-off duration time T2 in the engine brake traveling is set as the inertia traveling duration Tth, for example, in a case where it is assumed that the fuel economy effect of the inertia traveling is obtained when the pedal-off duration T1 in the inertia traveling is longer than the pedal-off duration T2 in the engine brake traveling.

In addition, when the preceding vehicle 35 is not detected, the inertia traveling duration Tth is replaced with a predetermined value set in advance. This predetermined value can be set to a value, for example, obtained by dividing the amount of fuel injected at the time of starting the engine by the amount of fuel consumed per second in the idle state. With this setting, it is possible to determine whether or not it is possible to save fuel that is equal to or larger than a consumption fuel amount accompanying the start of the engine. When this process is completed, the processing proceeds to Step S113.

<<Step S113>>

In Step S113, it is determined whether or not the pedal-off duration T1 when assuming that the inertia traveling has been performed is longer than the inertia traveling duration Tth (=T2) set in Step S112. When it is determined that the pedal-off duration time T1 in the inertia traveling is longer than the inertia traveling duration Tth (=T2), the processing proceeds to Step S114.

On the other hand, when it is determined that the pedal-off duration time T1 in the inertia traveling is shorter than the inertia traveling duration Tth (=T2), the processing proceeds to Step S108. This determination is performed to determine which one can improve fuel economy more between the inertia traveling and the engine brake traveling.

<<Step S114>>

When it is determined in Step S113 that the pedal-off duration T1 in the inertia traveling is longer than the inertia traveling duration Tth (=T2), the "engine stop and inertia traveling control" to disconnect the clutch and stop the drive of the engine (deceleration fuel cut) is executed in Step S114. Through this control, it is possible to perform the "engine stop and inertia traveling control" when an engine stop time, that is, a fuel cut time during the inertia traveling is longer than a fuel cut time during the engine brake traveling, and thus, the effect of improving the fuel economy can be obtained.

On the other hand, when it is determined in Step S113 that the pedal-off duration T1 in the inertia traveling is shorter than the inertia traveling duration Tth (=T2), the engine brake traveling is more effective in improving the fuel economy. Thus, the processing proceeds to Step S107, and the fuel cut control is executed by fastening the clutch so as to perform the engine brake traveling.

By executing the above-described control, it is possible to suppress the number of times of performing unnecessary engine stops and restarts when a prospect of improving the fuel economy by performing the inertia traveling is unclear due to the existence of the downward slope.

Although Step S112 and Step S113 are executed in the present embodiment, Step S112 and Step S113 can be also omitted in some cases.

FIG. 7 illustrates a speed of the subject vehicle, a height change of the rear bumper of the preceding vehicle, a fastening state of the clutch, and an engine rotational speed when the above-described control is executed. In FIG. 7, State 1 is a state where only the preceding vehicle 35 enters the downward slope as illustrated in FIG. 4A, and State 2 illustrates a state where the subject vehicle 36 also enters the downward slope as illustrated in FIG. 4B.

Regarding the vehicle speed of the subject vehicle 36, the vehicle speed decreases with a predetermined gradient in the case of traveling on a flat road as in State 1 as illustrated in (a) of FIG. 7. Then, the decrease of the vehicle speed is suppressed due to the influence of the downward slope while the subject vehicle 36 enters the downward slope, and then, completes the entrance. On the other hand, the vehicle speed decreases due to the action of the engine brake when shifting to State 2.

Further, as illustrated in (b) of FIG. 7, the stereo camera detects a position of the rear bumper of the preceding vehicle 35, and thus, the position of the rear bumper moves downward as the preceding vehicle 35 advances on the downward slope as illustrated in State 1. On the other hand, the position of the rear bumper does not change as illustrated in State 2 when the subject vehicle 36 also advances on the downward slope. Therefore, it is determined that the probability that the acceleration changes is high at the early stage of State 1.

When it is determined that the probability that the acceleration changes is high, the clutch is disconnected from the state where the clutch is fastened as illustrated in (c) of FIG. 7. In parallel with this operation, the fuel injection amount is controlled so as to obtain the idling rotational speed as illustrated in (d) of FIG. 7. In this state, the drive of the engine is stopped according to the related art, but the engine is driven in the idling state in the present embodiment. Therefore, the restart is necessary when shifting to State 2 according to the related art, but it is unnecessary to restart the engine in the present embodiment so that it is possible to reduce the number of operations of auxiliary components such as the starter.

Then, the control flow illustrated in FIGS. 3A-3C are executed when shifting to State 2 as illustrated in FIG. 4B while maintaining this state, and thus, the determination on whether or not the engine brake is necessary is performed, for example. When it is determined that the engine brake is necessary, the clutch is re-fastened and the rotation from the wheel is transmitted to increase the rotational speed of the engine. Thereafter, the engine rotational speed gradually decreases as the deceleration progresses.

Incidentally, the engine is not driven (fuel cut state) when the probability that the acceleration changes is low, and thus, the engine rotational speed is "0" and the clutch is disconnected in this state.

In this manner, the present embodiment is configured such that only the clutch is disconnected, and the engine continuously driven in the idling state when the probability of restarting the engine under the state of performing the "engine stop and inertia traveling control" is high. According to this configuration, the clutch is disconnected to perform the inertia traveling, and the engine is in the idling state, for example, when it is determined that the probability of restarting the engine is high as the acceleration of the subject vehicle or the preceding vehicle changes, and thus, it is unnecessary to restart the engine, and it is possible to suppress the number of restarts.

Second Embodiment

Next, the second embodiment of the present invention will be described, and the present embodiment is different from the first embodiment in terms that an object to be controlled is a traveling road where a curvature change region such as a curve exists.

In the present embodiment, a traveling road whose curvature changes (a so-called curved traveling road) exists in front of the subject vehicle 36 and the preceding vehicle 35 in a state where the subject vehicle 36 is traveling following the preceding vehicle 35, and the vehicles are traveling on this traveling road as illustrated in FIGS. 8A and 8B. For convenience of description, a curvature change start point and a curvature change finish point are set on the traveling road for convenience, and the curvature change start point and the curvature change finish point are recognized by the outside world recognition means 21.

FIG. 8A illustrates a state where the subject vehicle 36 has not yet entered a curvature change region of the traveling road, and the preceding vehicle 35 has entered a traveling road in the curvature change region. Further, FIG. 8A illustrates a state where the subject vehicle 35 is being decelerated because of entering the curvature change region and an inter-vehicle distance between the subject vehicle 36 and the preceding vehicle 35 is being increased.

FIG. 8B illustrates a state where the subject vehicle 36 has entered the traveling road in the curvature change region after a lapse of time, and thereafter, the subject vehicle 36 and the preceding vehicle 35 is traveling out of the curvature change region. Further, FIG. 8B illustrates a state where the subject vehicle 36 leaves out of the curvature change region and is accelerated and the inter-vehicle distance between the subject vehicle 36 and the preceding vehicle 35 is being decreased.

An operation of the vehicle integrated control unit 20 in such a state will be described with reference to the control flow illustrated in FIGS. 3A-3C. Incidentally, the same control steps as Steps S100 to S109, and Steps S111 to S114 in the control flow illustrated in FIGS. 3A-3C are performed, and thus, will not be described.

In Step S110, it is determined whether or not the subject vehicle 36 enters a change point of the curvature of the traveling road within the pedal-off duration T1 calculated in Step S108. When it is estimated that the vehicle enters the curvature change point, it is determined that there is a possibility that an acceleration of the subject vehicle may change as a driver of the subject vehicle 36 performs a decelerating operation.

The curvature change region can be detected by, for example, the stereo camera which is the outside world recognition sensor 21. That is, when a characteristic part of the preceding vehicle 35, for example, a position of a rear bumper passes through the curvature change start point in FIGS. 8A and 8B, it is possible to acquire the curvature change region by utilizing a fact that a lower end position of the rear bumper changes in the lateral direction. According to this method, it is possible to acquire information on the curvature change region using the outside world recognition sensor 21 so that curvature information can be detected without using a navigation device including the curvature information.

It is a matter of course that the present invention is not limited to such a method, and presence or absence of a change in curvature of the traveling road may be estimated based on a white line on the road (which can be estimated by curving of the white line), or the change in curvature of the traveling road may be estimated based on curvature information of the traveling road from map information of the navigation device. In addition, the presence or absence and a position of the change in curvature of the traveling road may be acquired from other vehicles including the preceding vehicle, the communication infrastructure on the road, and the like by wireless communication. The same processes as in the first embodiment are performed in Step S110 and the subsequent steps.

FIG. 9 illustrates a speed of the subject vehicle, a change in the lateral position of the rear bumper of the preceding vehicle, a fastening state of the clutch, and an engine rotational speed when the above-described control is executed. In FIG. 9, State 1 is a state where the preceding vehicle 35 enters the curvature change region as illustrated in FIG. 8A, and State 2 illustrates a state where both the preceding vehicle 35 and the subject vehicle 36 have left out of the curvature change finish point as illustrated in FIG. 8B.

Regarding the vehicle speed of the subject vehicle 36, the vehicle speed decreases with a predetermined gradient in the case of traveling on a straight road as in State 1 as illustrated in (a) of FIG. 9. Further, the decrease of the vehicle speed is continued due to the influence of the curvature while the subject vehicle 36 enters the curvature change region, and then, leaves out of the curvature change region. On the other hand, the vehicle speed decreases due to the action of the engine brake when shifting to State 2.

Further, as illustrated in (b) of FIG. 7, the stereo camera detects the lateral position of the rear bumper of the preceding vehicle 35, and thus, the position of the rear bumper moves to the side as the preceding vehicle 35 advances in the curvature change region as illustrated in State 1. On the other hand, the lateral position of the rear bumper does not change as illustrated in State 2 when the subject vehicle 36 also leaves out of the curvature change region. Therefore, it is determined that the probability that the acceleration changes is high at the early stage of State 1.

When it is determined that the probability that the acceleration changes is high, the clutch is disconnected from the state where the clutch is fastened as illustrated in (c) of FIG. 7. In parallel with this operation, the fuel injection amount is controlled so as to obtain the idling rotational speed as illustrated in (d) of FIG. 7. In this state, the drive of the engine is stopped according to the related art, but the engine is driven in the idling state in the present embodiment. Therefore, the restart is necessary when shifting to State 2 according to the related art, but it is unnecessary to restart the engine in the present embodiment so that it is possible to reduce the number of operations of auxiliary components such as the starter.

Then, the control flow according to the present embodiment is executed when shifting to State 2 as illustrated in FIG. 8B while maintaining this state, and thus, the determination on whether or not the engine brake is necessary is performed, for example. When it is determined that the engine brake is necessary, the clutch is re-fastened and the rotation from the wheel is transmitted to increase the rotational speed of the engine. Thereafter, the engine rotational speed gradually decreases as the deceleration progresses.

Incidentally, the engine is not driven when the probability that the acceleration changes is low, and thus, the engine rotational speed is "0" and the clutch is disconnected in this state.

According to the present embodiment, it is possible to suppress the number of times of performing the restart of the engine by determining the probability that the driver of the subject vehicle may perform a deceleration operation based on the change in curvature of the traveling road and continuing the drive of the engine during the inertia traveling until the change in curvature of the traveling road is finished.

In addition to the above-described embodiments, the embodiment can be further improved by adding the following technical functions in the present embodiment. The following technical functions are provided in the vehicle integrated control unit. Specifically, these are functions that are incorporated in software of the microcomputer.

For example, when the probability that the acceleration of the subject vehicle or the preceding vehicle changes is high, the time to disconnect the clutch and continue the drive of the engine can be set to time until the probability that the acceleration of the subject vehicle or the preceding vehicle changes decreases, that is, until a behavior or an event in which the acceleration of the subject vehicle changes is avoided or the change in the acceleration of the subject vehicle is ended.

In addition, the state where the acceleration of the subject vehicle or the preceding vehicle changes is a state of decreasing the resistance between the wheel of the subject vehicle and the road surface, such as a puddle, snow cover, and a frozen road surface present in front of the subject vehicle, and it is possible to determine that the probability that the acceleration changes is high by detecting this state.

In addition, the state where the acceleration of the subject vehicle or the preceding vehicle changes is a state of increasing the resistance between the wheel of the subject vehicle and the road surface, such as a gravel road present in front of the subject vehicle, and it is possible to determine that the probability that the acceleration changes is high by detecting this state.

In addition, it is possible to enhance safety by providing an abnormality detection means for determining an abnormality of the outside world recognition means such that re-fastening of the clutch is executed to perform the engine brake traveling when it is determined that the abnormality has occurred in the outside world recognition means and the clutch is disconnected in a state where the subject vehicle is traveling at a predetermined vehicle speed or higher.

In addition, it is possible to calculate the deceleration during the inertia traveling of the subject vehicle based on at least any one of vehicle speed of the subject vehicle, deceleration information during the previous or current inertia traveling, vehicle weight of the subject vehicle, and slope information of the road on which the subject vehicle travels. That is, it is possible to estimate and calculate a deceleration to be compared with the required deceleration, configured to determine whether the required deceleration is the required deceleration for which the engine brake traveling is necessary or the required deceleration for which the inertia traveling is necessary, as the inertia deceleration during the inertia traveling based on the vehicle speed and the traveling resistance of the subject vehicle.

As described above, it is configured such that only the clutch is disconnected and the engine is continuously driven at the predetermined rotational speed when the probability of restarting the engine under the state of performing the engine stop and inertia traveling control is high according to the present invention. According to this configuration, the clutch is disconnected to perform inertia traveling and the engine is in a driven state, for example, when it is determined that the probability of restarting the engine is high as an acceleration of a subject vehicle or a preceding vehicle changes, and thus, it is unnecessary to restart the engine and it is possible to suppress the number of restarts.

Further, it is possible to obtain the effect of improving the fuel economy through the engine stop and inertia traveling control, and to reduce the number of restarts in the lifetime of the vehicle, and thus, it is possible to reduce adverse effects on the auxiliary components such as the starter and the battery.

Incidentally, the present invention is not limited to the above-described embodiments, and includes various modification examples. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be also added to a configuration of a certain embodiment. In addition, addition, deletion or substitution of other configurations can be made with respect to some configurations of each embodiment.

REFERENCE SIGNS LIST 10 engine
11 automatic transmission
12 propeller shaft
13 differential gear
14 drive shaft
15R, 15F wheel
17 friction brake
18 engine control unit
19 transmission control unit
20 vehicle integrated control unit
21 outside world recognition means
22 wheel speed sensor
23 accelerator pedal
24 accelerator pedal sensor
25 brake pedal
26 brake pedal sensor
27 direction indicator sensor
28 gyro sensor
29 fuel injection hole
30 ignition unit
31 electronically controlled throttle valve
32 system determination unit
33 clutch state determination unit
34 engine state determination unit
35 preceding vehicle
36 subject vehicle

The invention claimed is:

1. A control apparatus for a vehicle comprising an automatic stop and restart means for automatically stopping and restarting an engine and disconnecting or fastening a clutch interposed between the engine and an automatic transmission, wherein the automatic stop and restart means executes engine drive and inertia traveling control to disconnect the clutch and continue drive of the engine in a state where a probability of restarting the engine under a state where engine stop and inertia traveling control to stop the engine and disconnect the clutch is performed is high, the probability of restarting the engine is a probability that an acceleration of the vehicle or a preceding vehicle changes, a rotational speed of the engine in the engine drive and inertia traveling control is a rotational speed in idling, the automatic stop and restart means comprises:
  a positional relationship determination means for obtaining a positional relationship between the vehicle and the preceding vehicle by at least an outside world recognition means for recognizing outside world environment;
  an acceleration change determination means for determining whether or not the probability that the acceleration of the vehicle or the preceding vehicle changes is high; and
  a control means for performing determination on disconnection and fastening of the clutch and stop and drive of the engine based on the positional relationship with the preceding vehicle and the probability that the acceleration of the vehicle or the preceding vehicle changes, wherein
  the control means executes the engine drive and inertia traveling control when it is determined that the probability that the acceleration of the vehicle or the preceding vehicle changes is high, and
  the acceleration change determination means determines that the probability that the acceleration changes is high when detecting a downward slope present in front of a traveling road of the vehicle.

2. The control apparatus for the vehicle according to claim 1, wherein
the automatic stop and restart means comprises:
  a positional relationship determination means for determining a positional relationship between the vehicle and the preceding vehicle by at least an outside world recognition means for recognizing outside world environment;
  an acceleration change determination means for determining whether or not the probability that the acceleration of the vehicle or the preceding vehicle changes is high;
  an accelerator pedal and brake pedal depression determination means for determining depression states of an accelerator pedal and a brake pedal; and
  a control means for performing determination on which one among the engine stop and inertia traveling control, the engine drive and inertia traveling control, and engine brake traveling control to stop the engine and fasten the clutch is to be executed based on the positional relationship with the preceding vehicle, the depression states of the accelerator pedal and the brake pedal, and the probability that the acceleration of the vehicle or the preceding vehicle changes,
  wherein the control means executes the engine drive and inertia traveling control when it is determined that the probability that the acceleration of the vehicle or the preceding vehicle changes is high.

3. The control apparatus for the vehicle according to claim 1, wherein
the acceleration change determination means determines that the probability that the acceleration changes is high when detecting a curvature change region present in front of a traveling road of the vehicle.

4. The control apparatus for the vehicle according to claim 1, wherein
the acceleration change determination means determines that the probability that the acceleration changes is high when detecting a puddle, snow cover, or a frozen road surface, which reduces a resistance between a wheel of the vehicle and a road surface of a traveling road, present in front of the traveling road of the vehicle.

5. The control apparatus for the vehicle according to claim 1, wherein
the acceleration change determination means determines that the probability that the acceleration changes is high when detecting a gravel road, which increases a resistance between a wheel of the vehicle and a road surface of a traveling road, present in front of the traveling road of the vehicle.

6. The control apparatus for the vehicle according to claim 2, wherein the control means sets a period the probability that the acceleration of the vehicle or the preceding vehicle changes becomes low or a change of the acceleration of the subject vehicle ends as the period during which the engine drive and inertia traveling control is executed.

7. The control apparatus for the vehicle according to claim 2, wherein the control means has a function of determining an abnormality of the outside world recognition means, and executes the engine brake traveling control by executing re-fastening of the clutch when it is determined that the abnormality occurs in the outside world recognition means and the clutch is disconnected in a state where the subject vehicle is traveling at a predetermined vehicle speed or higher.

8. The control apparatus for the vehicle according to claim 2, wherein
when detecting a state where the accelerator pedal and the brake pedal are not depressed using information of the accelerator pedal and brake pedal depression determination means, the control means obtains a current required deceleration of the vehicle at least based on an inter-vehicle distance and a relative speed between the vehicle and the preceding vehicle using information from the positional relationship determination means, further determines whether the required deceleration is a required deceleration for which engine brake traveling is necessary or a required deceleration for which inertia traveling is necessary, determines the probability that the acceleration of the vehicle or the preceding vehicle changes using information from the acceleration change determination means when determining that the required deceleration is the required deceleration for which the inertia traveling is necessary, executes the engine drive and inertia traveling control when determining that the probability of change of the acceleration is high, and executes the engine stop and inertia traveling control when determining that the probability of change of the acceleration is low.

9. The control apparatus for a vehicle according to claim 8, wherein
the control means estimates and calculates a deceleration to be compared with the required deceleration, configured to determine whether the required deceleration is the required deceleration for which the engine brake traveling is necessary or the required deceleration for which the inertia traveling is necessary, as an inertia deceleration during the inertia traveling based on a vehicle speed and a traveling resistance of the vehicle.

10. A control apparatus for a vehicle comprising an automatic stop and restart means for automatically stopping and restarting an engine and disconnecting or fastening a clutch interposed between the engine and an automatic transmission, wherein the automatic stop and restart means executes engine drive and inertia traveling control to disconnect the clutch and continue drive of the engine in a state where a probability of restarting the engine under a state where engine stop and inertia traveling control to stop the engine and disconnect the clutch is performed is high, the probability of restarting the engine is a probability that an acceleration of the vehicle or a preceding vehicle changes, a rotational speed of the engine in the engine drive and inertia traveling control is a rotational speed in idling, the automatic stop and restart means comprises:
a positional relationship determination means for obtaining a positional relationship between the vehicle and the preceding vehicle by at least an outside world recognition means for recognizing outside world environment;
an acceleration change determination means for determining whether or not the probability that the acceleration of the vehicle or the preceding vehicle changes is high; and
a control means for performing determination on disconnection and fastening of the clutch and stop and drive of the engine based on the positional relationship with the preceding vehicle and the probability that the acceleration of the vehicle or the preceding vehicle changes, wherein
the control means executes the engine drive and inertia traveling control when it is determined that the probability that the acceleration of the vehicle or the preceding vehicle changes is high, and
the control means sets a period the probability that the acceleration of the subject vehicle or the preceding vehicle changes becomes low or a change of the acceleration of the subject vehicle ends as the period during which the engine drive and inertia traveling control is executed.

11. A control apparatus for a vehicle comprising an automatic stop and restart means for automatically stopping and restarting an engine and disconnecting or fastening a clutch interposed between the engine and an automatic transmission, wherein the automatic stop and restart means executes engine drive and inertia traveling control to disconnect the clutch and continue drive of the engine in a state where a probability of restarting the engine under a state where engine stop and inertia traveling control to stop the engine and disconnect the clutch is performed is high, the probability of restarting the engine is a probability that an acceleration of the vehicle or a preceding vehicle changes, a rotational speed of the engine in the engine drive and inertia traveling control is a rotational speed in idling, the automatic stop and restart means comprises:
a positional relationship determination means for obtaining a positional relationship between the vehicle and the preceding vehicle by at least an outside world recognition means for recognizing outside world environment;
an acceleration change determination means for determining whether or not the probability that the acceleration of the vehicle or the preceding vehicle changes is high; and
a control means for performing determination on disconnection and fastening of the clutch and stop and drive of the engine based on the positional relationship with the preceding vehicle and the probability that the acceleration of the vehicle or the preceding vehicle changes, wherein
the control means executes the engine drive and inertia traveling control when it is determined that the probability that the acceleration of the vehicle or the preceding vehicle changes is high, and
the control means has a function of determining an abnormality of the outside world recognition means, and executes the engine brake traveling control by executing re-fastening of the clutch when it is determined that the abnormality occurs in the outside world recognition means and the clutch is disconnected in a state where the subject vehicle is traveling at a predetermined vehicle speed or higher.

12. A control apparatus for a vehicle comprising an automatic stop and restart means for automatically stopping and restarting an engine and disconnecting or fastening a clutch interposed between the engine and an automatic transmission, wherein the automatic stop and restart means executes engine drive and inertia traveling control to disconnect the clutch and continue drive of the engine in a state where a probability of restarting the engine under a state where engine stop and inertia traveling control to stop the engine and disconnect the clutch is performed is high, the probability of restarting the engine is a probability that an acceleration of the vehicle or a preceding vehicle changes, a rotational speed of the engine in the engine drive and inertia traveling control is a rotational speed in idling, the automatic stop and restart means comprises:
a positional relationship determination means for determining a positional relationship between the vehicle and the preceding vehicle by at least an outside world recognition means for recognizing outside world environment;
an acceleration change determination means for determining whether or not the probability that the acceleration of the vehicle or the preceding vehicle changes is high;
an accelerator pedal and brake pedal depression determination means for determining depression states of an accelerator pedal and a brake pedal; and
a control means for performing determination on which one among the engine stop and inertia traveling control, the engine drive and inertia traveling control, and engine brake traveling control to stop the engine and fasten the clutch is to be executed based on the positional relationship with the preceding vehicle, the depression states of the accelerator pedal and the brake pedal, and the probability that the acceleration of the vehicle or the preceding vehicle changes, wherein
the control means executes the engine drive and inertia traveling control when it is determined that the probability that the acceleration of the vehicle or the preceding vehicle changes is high, and
when detecting a state where the accelerator pedal and the brake pedal are not depressed using information of the accelerator pedal and brake pedal depression determination means, the control means obtains a current required deceleration of the vehicle at least based on an inter-vehicle distance and a relative speed between the vehicle and the preceding vehicle using information from the positional relationship determination means, further determines whether the required deceleration is a required deceleration for which engine brake traveling is necessary or a required deceleration for which inertia traveling is necessary, determines the probability that the acceleration of the vehicle or the preceding vehicle changes using information from the acceleration change determination means when determining that the required deceleration is the required deceleration for which the inertia traveling is necessary, executes the engine drive and inertia traveling control when determining that the probability of change of the acceleration is high, and executes the engine stop and inertia traveling control when determining that the probability of change of the acceleration is low.

* * * * *